(12) United States Patent
Goyal et al.

(10) Patent No.: US 6,976,258 B1
(45) Date of Patent: Dec. 13, 2005

(54) PROVIDING QUALITY OF SERVICE GUARANTEES TO VIRTUAL HOSTS

(75) Inventors: Pawan Goyal, Mountain View, CA (US); Xun Wilson Huang, Mountain View, CA (US); Srinivasan Keshav, Mountain View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/452,286

(22) Filed: Nov. 30, 1999

(51) Int. Cl.[7] .......................... G06F 9/46; G06F 9/455; G06F 15/16
(52) U.S. Cl. ..................... 718/104; 718/1; 718/100; 718/102; 709/201
(58) Field of Search ........................... 709/1, 100, 102, 709/104, 107, 200–203; 718/1, 100, 102, 718/104, 107; 424/139.1, 185.1, 9.2, 130.1; 530/300; 514/2

(56) References Cited

U.S. PATENT DOCUMENTS

| | | |
|---|---|---|
| 3,377,624 A | 4/1968 | Nelson et al. |
| 4,177,510 A | 12/1979 | Appell et al. ................ 364/200 |
| 5,189,667 A | 2/1993 | Esaki et al. |
| 5,212,793 A | 5/1993 | Donica et al. |
| 5,226,160 A | 7/1993 | Waldron et al. |
| 5,249,290 A | 9/1993 | Heizer |
| 5,263,147 A | 11/1993 | Francisco et al. ........... 395/425 |
| 5,325,530 A | 6/1994 | Mohrmann |
| 5,437,032 A | 7/1995 | Wolf et al. |
| 5,528,753 A | 6/1996 | Fortin |
| 5,572,680 A | 11/1996 | Ikeda et al. |
| 5,584,023 A | 12/1996 | Hsu |
| 5,603,020 A | 2/1997 | Hashimoto et al. .......... 395/616 |
| 5,623,492 A | 4/1997 | Teraslinna |
| 5,636,371 A | 6/1997 | Yu ............................ 395/500 |
| 5,640,595 A * | 6/1997 | Baugher et al. .............. 710/10 |
| 5,692,047 A | 11/1997 | McManis ...................... 380/4 |
| 5,706,097 A | 1/1998 | Schelling et al. ........... 358/296 |
| 5,706,453 A | 1/1998 | Cheng et al. |
| 5,708,774 A | 1/1998 | Boden |

(Continued)

FOREIGN PATENT DOCUMENTS

| | | |
|---|---|---|
| JP | 64-002145 | 1/1989 |

(Continued)

OTHER PUBLICATIONS

Boehm, B., "Managing Software Productivity and Reuse," IEEE Computer, vol. 32, No. 9, Sep. 1999, 3 pages.

(Continued)

*Primary Examiner*—Meng-Al T. An
*Assistant Examiner*—Syed J Ali
(74) *Attorney, Agent, or Firm*—Fenwick & West LLP

(57) ABSTRACT

A method facilitates providing appropriate quality of service guarantees to a plurality of virtual hosts on a single physical host computer. A server application program and its child processes service communication requests made to the plurality of virtual hosts. Quality of service parameters associated with the virtual hosts are stored. Communication requests made to a specific one of the virtual hosts are detected. The quality of service parameters associated with the specific virtual host are obtained. Operating system resources are utilized to guarantee, to a child process of the server application program, a quality of service according to the obtained quality of service parameters associated with the virtual host. Communication between the virtual host and the client is allowed to proceed, the communication being managed by the child process.

18 Claims, 7 Drawing Sheets

U.S. PATENT DOCUMENTS

| | | | |
|---|---|---|---|
| 5,719,854 A | 2/1998 | Choudhury et al. | |
| 5,727,203 A | 3/1998 | Hapner et al. | |
| 5,748,614 A | 5/1998 | Wallmeier | |
| 5,752,003 A | 5/1998 | Hart | |
| 5,761,477 A | 6/1998 | Wahbe et al. | 395/406 A |
| 5,764,889 A | 6/1998 | Ault et al. | |
| 5,781,550 A | 7/1998 | Templin et al. | 370/401 |
| 5,799,173 A | 8/1998 | Gossler et al. | |
| 5,809,527 A | 9/1998 | Cooper et al. | 711/133 |
| 5,828,893 A | 10/1998 | Weid et al. | 395/800 |
| 5,838,686 A | 11/1998 | Ozkan | |
| 5,838,916 A | 11/1998 | Domenikos et al. | 395/200.49 |
| 5,842,002 A | 11/1998 | Schnurer et al. | 395/500 |
| 5,845,129 A | 12/1998 | Wendorf et al. | 395/726 |
| 5,850,399 A | 12/1998 | Ganmukhi et al. | |
| 5,860,004 A | 1/1999 | Fowlow et al. | |
| 5,864,683 A | 1/1999 | Boebert et al. | |
| 5,889,956 A | 3/1999 | Hauser et al. | |
| 5,889,996 A | 3/1999 | Adams | |
| 5,892,968 A | 4/1999 | Iwasaki et al. | |
| 5,905,730 A | 5/1999 | Yang et al. | |
| 5,905,859 A | 5/1999 | Holloway et al. | |
| 5,913,024 A | 6/1999 | Green et al. | 395/186 |
| 5,915,085 A | 6/1999 | Koved | 395/186 |
| 5,915,095 A | 6/1999 | Miskowiec | |
| 5,918,018 A | 6/1999 | Gooderum et al. | 395/200.55 |
| 5,920,699 A | 7/1999 | Bare | |
| 5,933,603 A | 8/1999 | Vahalia et al. | |
| 5,937,159 A | 8/1999 | Meyers et al. | 395/187.01 |
| 5,956,481 A | 9/1999 | Walsh et al. | 395/186 |
| 5,961,582 A | 10/1999 | Gaines | |
| 5,978,373 A | 11/1999 | Hoff et al. | |
| 5,982,748 A | 11/1999 | Yin et al. | |
| 5,987,524 A | 11/1999 | Yoshida et al. | |
| 5,991,812 A | 11/1999 | Srinivasan | |
| 5,999,963 A * | 12/1999 | Bruno et al. | 709/104 |
| 6,016,318 A | 1/2000 | Tomoike | |
| 6,018,527 A | 1/2000 | Yin et al. | |
| 6,023,721 A | 2/2000 | Cummings | 709/201 |
| 6,038,608 A | 3/2000 | Katsumata | |
| 6,038,609 A * | 3/2000 | Geulen | 709/250 |
| 6,047,325 A | 4/2000 | Jain et al. | |
| 6,055,617 A | 4/2000 | Kingsbury | |
| 6,061,349 A | 5/2000 | Coile et al. | |
| 6,065,118 A | 5/2000 | Bull et al. | 713/200 |
| 6,075,791 A | 6/2000 | Chiussi et al. | |
| 6,075,938 A | 6/2000 | Bugnion et al. | 395/500.48 |
| 6,078,929 A | 6/2000 | Rao | |
| 6,078,957 A | 6/2000 | Adelman et al. | |
| 6,086,623 A * | 7/2000 | Broome et al. | 703/26 |
| 6,092,178 A | 7/2000 | Jindal et al. | |
| 6,094,674 A * | 7/2000 | Hattori et al. | 709/203 |
| 6,101,543 A | 8/2000 | Alden et al. | |
| 6,108,701 A | 8/2000 | Davies et al. | |
| 6,108,759 A | 8/2000 | Orcutt et al. | 711/173 |
| 6,122,673 A | 9/2000 | Basak et al. | |
| 6,154,776 A | 11/2000 | Martin | |
| 6,154,778 A | 11/2000 | Koistinen et al. | |
| 6,161,139 A | 12/2000 | Win et al. | |
| 6,167,520 A | 12/2000 | Touboul | 713/200 |
| 6,172,981 B1 | 1/2001 | Cox et al. | |
| 6,189,046 B1 | 2/2001 | Moore et al. | |
| 6,192,389 B1 * | 2/2001 | Ault et al. | 709/101 |
| 6,192,512 B1 | 2/2001 | Chess | 717/5 |
| 6,230,203 B1 | 5/2001 | Koperda et al. | |
| 6,240,463 B1 * | 5/2001 | Benmohamed et al. | 709/238 |
| 6,247,057 B1 | 6/2001 | Barrera, III | |
| 6,259,699 B1 | 7/2001 | Opalka et al. | |
| 6,266,678 B1 | 7/2001 | McDevitt et al. | |
| 6,269,404 B1 | 7/2001 | Hart et al. | |
| 6,279,039 B1 | 8/2001 | Bhat et al. | |
| 6,279,040 B1 * | 8/2001 | Ma et al. | 709/231 |
| 6,282,581 B1 * | 8/2001 | Moore et al. | 709/316 |
| 6,282,703 B1 | 8/2001 | Meth et al. | |
| 6,286,047 B1 | 9/2001 | Ramanathan et al. | |
| 6,298,479 B1 | 10/2001 | Chessin et al. | |
| 6,314,558 B1 | 11/2001 | Angel et al. | |
| 6,327,622 B1 | 12/2001 | Jindal et al. | |
| 6,336,138 B1 | 1/2002 | Caswell et al. | |
| 6,351,775 B1 | 2/2002 | Yu | |
| 6,353,616 B1 | 3/2002 | Elwalid et al. | |
| 6,363,053 B1 | 3/2002 | Schuster et al. | |
| 6,370,583 B1 * | 4/2002 | Fishler et al. | 709/238 |
| 6,381,228 B1 | 4/2002 | Prieto, Jr. et al. | |
| 6,385,638 B1 * | 5/2002 | Baker-Harvey | 709/107 |
| 6,389,448 B1 | 5/2002 | Primak et al. | |
| 6,393,484 B1 | 5/2002 | Massarani | |
| 6,425,003 B1 | 7/2002 | Herzog et al. | |
| 6,430,622 B1 | 8/2002 | Aiken, Jr. et al. | |
| 6,434,631 B1 * | 8/2002 | Bruno et al. | 710/6 |
| 6,434,742 B1 | 8/2002 | Koepele, Jr. | |
| 6,438,134 B1 | 8/2002 | Chow et al. | |
| 6,442,164 B1 | 8/2002 | Wu | |
| 6,449,652 B1 | 9/2002 | Blumenau et al. | |
| 6,457,008 B1 | 9/2002 | Rhee et al. | |
| 6,463,459 B1 | 10/2002 | Orr et al. | |
| 6,470,398 B1 | 10/2002 | Zargham et al. | |
| 6,487,578 B2 * | 11/2002 | Ranganathan | 709/104 |
| 6,487,663 B1 | 11/2002 | Jaisimha et al. | |
| 6,490,670 B1 | 12/2002 | Collins et al. | |
| 6,499,137 B1 | 12/2002 | Hunt | |
| 6,529,950 B1 | 3/2003 | Lumelsky et al. | |
| 6,542,167 B1 | 4/2003 | Darlet et al. | |
| 6,553,413 B1 | 4/2003 | Leighton et al. | |
| 6,578,055 B1 | 6/2003 | Hutchison et al. | |
| 6,578,068 B1 | 6/2003 | Bowman-Amuah | |
| 6,580,721 B1 | 6/2003 | Beshai | |
| 6,647,422 B2 * | 11/2003 | Wesinger et al. | 709/228 |
| 6,658,571 B1 | 12/2003 | O'Brien et al. | |
| 6,691,312 B1 | 2/2004 | Sen et al. | |
| 6,725,456 B1 * | 4/2004 | Bruno et al. | 718/102 |
| 6,760,775 B1 * | 7/2004 | Anerousis et al. | 709/238 |
| 6,820,117 B1 * | 11/2004 | Johnson | 709/223 |
| 2003/0061338 A1 | 3/2003 | Stelliga | |

FOREIGN PATENT DOCUMENTS

| | | |
|---|---|---|
| WO | WO 99/39261 | 8/1999 |

OTHER PUBLICATIONS

Deutsch, P. and Grant, C.A., "A Flexible Measurement Tool for Software Systems," Information Processing (Proc. of the IFIP Congress), 1971, pp. 320-326.

Edjlali, G., et al., "History-based Access Control for Mobile Code," Fifth ACM Conference on Computer and Communication Security, Nov. 3-5, 1998, 19 pages.

Erlingsson, U. and Schneider, F. B., "SASI Enforcement of Security Policies: A Retrospective," Proc. New Security Paradigms Workshop, Apr. 2, 1999, pp 1-17.

Evans, D. and Twyman, A., "Flexible Policy-Directed Code Safety," Proc. of 1999 IEEE Symposium on Security and Privacy, Oakland, CA, May 9-12, 1999, pp. 1-14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp 34-45.

Pandey, R. and Hashii, B., "Providing Fine-Grained Access Control For Mobile Programs Through Binary Editing," Technical Report TR98 08, University of California, Davis, CA, 1998, pp 1-22.

Saltzer, J., H. and Schroeder, M. D., The Protection of Information in Computer Systems, [online], 1973, [retrieved on Apr. 2, 2002]. Retrieved from the Internet: <URL: http://www.cs.virginia.edu~evans/cs551/saltzer/.html>.

Wahbe, R., et al., "Efficient Software-Based Fault Isolation," Proc. of the Symposium on Operating System Principles, 1993, 14 pages.

Keshav, S., *An Engineering Approach to Computer Networking: ATM Networks, the Internet, and the Telephone Network*, Reading, MA, Addison-Wesley, 1997, pp vii-xi, 85-115, 209-355, 395-444.

Stevens, R. W., *UNIX Network Programming vol. 1 Networking APIs: Sockets and XTI*, Upper Saddle River, NJ, Prentice Hall, 1998, pp v-xiv, 29-53, 85-110, 727-760.

Tanenbaum, A. S. and Woodhull, A. S., *Operating Systems: Design and Implementation*, Upper Saddle River, NJ, Prentice Hall, 1997, pp vii-xiv, 1-46, 401-454.

Rubini, A., *LINUX Device Drivers*, Sebastopol, CA, O'Reilly & Associates, Inc., 1998, pp v-x, 13-40.

Goyal, P., et al., "A Hierarchical CPU Scheduler for Multimedia Operating Systems," *Proceedings of the Second Symposium on Operating Systems Design and Implementations (OSDI'96)*, Seattle, WA, Oct. 1996, 15 pages.

Laurie, B. and Laurie, P., *Apache The Definitive Guide*, Sebastopol, CA, O'Reilly & Associates, Inc., Feb. 1999, pp v-viii, 43-74.

Aho, A. V. and Ullman J. D., *Principles of Complier Design*, Reading, MA, 1977 pp vii-x, 359-362, 519-522.

Jonsson, J., "Exploring the Importance of Preprocessing Operations in Real-Time Multiprocessor Scheduling," *Proc. of the IEEE Real-Time Systems Symposium—Work-in-Progress session*, San Francisco, CA, Dec. 4, 1997, pp 31-34.

Rusling, D. A., Processes, [online], [retrieved on Dec. 7, 1999]. Retrieved from the Internet: <URL: http://www.cebaf.gov/~saw/linux/tlk-html/node44.html>.

Rusling, D. A., Linux Processes, [online], [retrieved on Dec. 7, 1999]. Retrieved from the Internet: <URL: http://www.cebaf.gov/~saw/linux/tlk-html/node45.html>.

Rusling, D. A., Identifiers, [online], [retrieved on Dec. 7, 1999]. Retrieved from the Internet: <URL: http://www.cebaf.gov/~saw/linux/tlk-html/node46.html>.

Rusling, D. A., Scheduling, [online], [retrieved on Dec. 7, 1999]. Retrieved from the Internet: <URL: http://www.cebaf.gov/~saw/linux/tlk-html/node47.html>.

Rusling, D. A., Schedluing in Multiprocessor Systems, [online], [retrieved on Dec. 7, 1999]. Retrieved from the Internet: <URL: http://www.cebaf.gov/~saw/linux/tlk-html/node48.html>.

Rusling, D. A., Files, [online], [retrieved on Dec. 7, 1999]. Retrieved from the Internet: <URL: http://www.cebaf.gov/~saw/linux/tlk-html/node49.html>.

Plummer, D. C., *An Ethernet Address Resolution Protocol—or—Converting Network Protocol Addresses to 48.bit Ethernet Address for Transmission on Ethernet Hardware*, Nov. 1982, [online], [retrieved on Jan. 17, 2000], Retrieved from the Internet: <URL: http://www.msg.net/kadow/answers/extras/rfc/rfc826.txt>.

Huang, X. W. et al., "The ENTRAPID Protocol Development Environment," *Proceedings of IEEE Infocom'99*, Mar. 1999, nine pages.

Duffield, N.G., et al., "A Flexible Model for Resource Management in Virtual Private Networks," *Computer Communication Review Conference, Computer Communication*, ACM SIGCOMM '99 Conference, Cambridge, MA, Aug. 30, 1999-Sep. 3, 1999. pp 95-108.

Campbell, A. T. and Keshav, S., "Quality of Service in Distributed Systems," *Computer Communications 21*, 1998, pp 291-293.

Bach, M. J., *The Design of the Unix® Operating System*, New Delhi, Prentice-Hall of India, 1989, pp v-x, 19-37.

McDougall, R., et al., *Resource Management*, Upper Saddle River, NJ, Prentice Hall, 1999, pp iii-xix, 135-191.

Rijsinghani, A. RFC 1624, May 1994, [online], [retrieved Feb. 2, 2000]. retrieved from the internet: <URL: http://www.faqs.org/rfcs/rfc1624.html>.

Mallory, T and Kullberg, A., RFC 1141, Jan. 1990, [online], [retrieved Feb. 2, 2000]. retrieved from the Internet: <URL: http://www.faqs.org/rfcs/rfc1141.html>.

Egevang, K. and Francis P., RFC 1631, May 1994, [online], [retrieved Feb. 2, 2000]. retrieved from the Internet: <URL: http://www.faqs.org/rfcs/rfc1631.html>.

Goyal, P. et al., "Start-time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the internet: <URL: http://cs.cornell.edu/Info/Courses/Spring-97/CS614/goy.html>.

Goyal, P., "Packet Scheduling Algorithms for Integrated Services Networks," PhD Dissertation, University of Texas, Austin, TX, Aug. 1997.

Corbato, F. J. et al. "An Experimental Timesharing System," Proceedings of the American Federation Of Information Processing Societies Spring Joint Computer Conference, San Francisco, CA, May 1-3, 1962, pp 335-344.

Ritchie, D. M., "The Evolution of the Unix Time-Sharing System," AT&T Bell Laboratories Technical Journal 63, No. 6, Part 2, Oct. 1984, (originally presented 1979), 11 pages.

Goyal, Pawan et al., *Generalized Guaranteed Rate Scheduling Algorithms: A Framework*, IEEE/ACM Transactions, vol. 5, Issue: 4, Aug. 1997, pp. 561-571.

Symbol Table, [online] copyright 1997, 1998, [Retrieved on Apr. 4, 2003] Retrieved from the internet <URL: http://216.239.33.100/search?q=cache:eASXk8qC_-AC:www.caldera.com/developers/gabi/1998-04-29/ch4.s . . . , pp. 1-5.

Mitra, Debasis et al., "Hierarchical Virtual Partitioning: Algorithms for Virtual Private Networking," Bell Labs Technical Journal, Spring, 1997, http://cm.bell-labs.com/cm/ms/who/mitra/papers/globe.ps.

\* cited by examiner

PROVIDING QUALITY OF SERVICE GUARANTEES TO VIRTUAL HOSTS

BACKGROUND

1. Field of Invention

The present invention relates generally to guaranteeing appropriate quality of service to virtual processes executing on multitasking operating systems, and specifically in one embodiment to guaranteeing quality of service to virtual hosts servicing client requests to multiple network addresses on a single physical host computer.

2. Background of Invention

With the popularity and success of the Internet, server technologies are of great commercial importance today. Typically, a server program executing on a single physical host computer services client requests made to a single network address allocated to the host. However, using Transmission Control Protocol (TCP) and other transport protocols, a server application executing on a single physical host can be programmed to process requests made to multiple network addresses. Such functionality is known as virtual hosting.

To enable virtual hosting, more than one network address is assigned to a single physical host computer. A server program executing on the host opens a communication transport channel (socket) and allows receipt of incoming communications targeted for any of the multiple network addresses assigned to the host. Accepting a communication request by a server executing TCP is a three step process that comprises waiting for the communication request from a client, sending an acknowledgment signal to the client, and receiving a return acknowledgment signal from the client. This three step process is called "three way handshaking" and is a feature of TCP communication. While accepting a communication request, a server is unable to execute other tasks. Thus, a server cannot wait for one incoming communication request and simultaneously service a separate communication request. However, multiple communication requests made to a plurality of network addresses associated with a single physical host require simultaneous service. For this reason, a virtual host server typically accepts the communications requests itself and creates child processes to service the requests.

Two known methods exist for utilizing child processes to service communication requests. The most common involves accepting the communication request by the server, and then generating (forking) a child process to service it. While the child process services the request made by the client and transmits it to the client, the server is free to accept the next communication request, perhaps from another client. As soon as the server accepts a request, the server generates a new child process, which services the request and then terminates. This method of virtual hosting, know as "fork after accept," is widely used today.

Another method of virtual hosting comprises generating, by the server, a plurality of child processes. The number of child processes created reflects a desired maximum number of communication requests to service simultaneously. Each child process proceeds to accept a communication request. Thus, each child waits for an incoming communication request, services it, and proceeds to wait for a next request. While a child process is servicing a request it cannot be waiting for another request, but this is allowable because other child processes are waiting for incoming requests. Where all the child processes are busy servicing requests, the maximum desired number of requests is being serviced, and no more can be accepted until one of the child processes finishes servicing a request and begins waiting for a new one. This method, called "fork before accept," is known and used today, although less commonly than "fork after accept."

Both virtual host systems that utilize the fork before accept method and those that utilize the fork after accept method can be name-based as well as address-based. As described above, in an address-based virtual host system, each virtual host is identified by a separate network address assigned to a single, physical host. In contrast, in a name-based virtual host system, each virtual host is identified not by a network address, but instead by a domain name. Multiple domain names can be assigned to a single address. Thus, multiple virtual hosts, each identified by a unique domain name, can all be assigned to a single network address. The single network address to which the multiple domain names are assigned is assigned to the single, physical host. Communication requests to a name-based virtual host are made to a domain name, not to a network address. As with address-based virtual host systems, all virtual hosts map to a single physical host.

A virtual host system simulates multiple hosts by servicing client requests made to any of the multiple network addresses or domain names. This is desirable, because providing a unique physical host for each network address or domain name is expensive and inefficient. Hosting services are often provided commercially by an Internet Service Provider (ISP). Without virtual hosting, an ISP would have to provide a separate physical host computer with a unique network address for every customer that purchases host services. Often, a customer purchasing host services from an ISP will neither require nor be amenable to paying for use of an entire host computer. Generally, only a fraction of the processing power, storage, and other resources of a host computer will be required to meet the needs of an individual customer.

Virtual hosting allows an ISP to utilize one physical host computer to provide commercial host services to multiple customers, thereby creating a virtual host server. Each customer is assigned a network address (or domain name), and is provided with resources on the single, physical host computer, effectively sharing the host with other customers. A client computer requests data from a specific customer's host by targeting communication requests to the appropriate network address (or domain name). By utilizing the fork before accept method or the fork after accept method, the virtual host server can service requests to multiple network addresses or domain names. Thus, the functionality of numerous hosts is provided by a single physical host computer, servicing requests made to a plurality of network addresses and domain names by multiple customers.

One shortcoming with virtual hosting as it exists today is the inability to allocate appropriate amounts of computer resources of the physical host to servicing client requests made to specific virtual hosts, and hence to specific customers. Where an ISP provides host services to multiple customers on a single physical computer, it is desirable to allot to each virtual host a specific amount of computer resources appropriate to the needs of the customer, and preferably based upon the amount paid for the services. For example, suppose two customers purchase host services from an ISP. The first customer is a large corporation providing financial services to thousands of clients internationally. The financial services host requires a great deal of storage space, as well as prompt response time to all client requests. Of course, the first customer is willing to compensate the ISP appropriately for providing such a level of host services. The second customer is a sole proprietorship that sells floral arrangements locally. The second customer has a very limited budget, but only requires minimal computer resources. Clearly, it is desirable for the ISP to allocate different percentages of the system resources to the two separate virtual hosts provided by the ISP for the two separate customers. However, this is not possible with conventional virtual hosting techniques.

Multitasking operating systems such as UNIX facilitate specification of resource allocation to multiple concurrent processes. The operating system can be instructed as to how to allocate resources to different processes. System resources can be allocated to processes as a percentage of resources available (for example, the operating system may be instructed to allocate twenty percent of the central processing unit cycles to process A and two percent to process B), or as specific numbers of units (for example, the operating system may be instructed to allocate X cycles per second to process A and Y cycles per second to process B). Such specification of resource allocation is called a guarantee of quality of service.

A server, which is a process, executing on a dedicated physical host services client requests for a single network address (physical host) only. Thus, quality of service can simply be set for the server to the quality of service appropriate for the host. A virtual host server services numerous client requests for multiple virtual hosts. A single virtual host server provides host services for a plurality of customers all of whom may require different quality of service. Although it would be possible to set a single quality of service for the virtual host server, no single quality of service is appropriate for all of the virtual hosts. Because the appropriate quality of service for different virtual hosts is different, providing a single quality of service for all virtual hosts is undesirable. As detailed above, ISP's utilize single server application programs to provide virtual hosting services to multiple customers with varying business needs and budgets. It would be desirable for an ISP to be able to make appropriate quality of service guarantees to different customers purchasing virtual host services. However, conventional virtual host systems can provide only the same quality of service for all virtual hosts supported by the server. With existing virtual host systems, an ISP cannot provide one quality of service to the international financial services corporation of the example given above, and another to the local florist. The ISP either must provide each customer with the same quality of service, which is undesirable, or provide each customer with a separate physical host, which is inefficient and expensive for the ISP, as many customers do not require the resources of a dedicated host computer. What is needed is a virtual host system that provides appropriate quality of service guarantees for each virtual host.

Virtual host systems are being utilized today by ISP's and other providers of host services. As explained above, it would be desirable for existing ISP's providing virtual host systems to be able to provide appropriate quality of service guarantees to multiple virtual hosts. However, many such ISP's would not want to replace their existing virtual host system with one that could provide such guarantees, even if such a system were available. Upgrading a virtual host system is a time consuming and complicated process, often involving costly down time and high labor expenses. It would be desirable to have a system to allow existing users to provide appropriate quality of service guarantees to multiple virtual hosts, without having to upgrade or replace their existing virtual host systems.

SUMMARY OF INVENTION

The present invention allows providers of virtual host services to make appropriate quality of service guarantees to multiple virtual hosts. In one embodiment, the present invention executes as a virtual host quality of service application program on the same physical host computer as an existing virtual host server. The application program modifies the operating system of the host computer to include a quality of service table comprising appropriate quality of service parameters for all virtual hosts. Then, object code is inserted into the operating system. The object code comprises computer instructions to obtain quality of service parameters for a particular virtual host from the table, and to set the quality of service for the virtual host according to these parameters. Once the object code is inserted, system calls to the operating system pertaining to communications between one of the virtual hosts and a client are intercepted. The system calls are intercepted by replacing a pointer in an operating system function table with a pointer to the inserted object code, so that when a system call is made, the inserted object code is executed rather than the system call. The object code obtains quality of service parameters for the selected virtual host from the quality of service table, and the appropriate quality of service is guaranteed to the virtual host. Virtual host systems utilize child processes of a parent server application to manage communications between a virtual host and a client. Therefore, the inserted object code can guarantee the appropriate quality of service to the virtual host by setting the quality of service guarantees for the child process managing the communication between the virtual host and the client. After the quality of service guarantees are set, the communication between the virtual host and the client proceeds.

The present invention works for all types of virtual hosting systems, including both those that utilize the fork before accept method and those that utilize the fork after accept method. To set quality of service guarantees for a virtual host system utilizing the fork before accept method, system calls that establish a communication channel between a client and a select one of the virtual hosts are intercepted. These system calls are made by child processes of the server application. The present invention then guarantees quality of service appropriate for the virtual host to the child process that made the intercepted system call. Once the quality of service is guaranteed, the child process that made the system call manages the communication between the virtual host and the client.

Guaranteeing quality of service to virtual hosts of a system utilizing the fork after accept method is similarly facilitated. In a system utilizing the fork after accept method, a communication channel is established by the server application prior to generation of a child process to service a communication request. At the time a communication channel is established, it is unknown what child process will service that communication channel. Therefore, under these circumstances, the virtual host quality of service application program intercepts system calls, made by child processes, that transport data through already established communication channels. When such a system call is made, the virtual host quality of service program determines the virtual host to which the client is communicating via the channel. Appropriate quality of service is then guaranteed to the child process that made the intercepted system call. The child process then proceeds to manage communication between the virtual host and the client.

The present invention also guarantees appropriate quality of service to name-based virtual hosts. Clients make communication requests to name-based virtual hosts by passing a domain name to the virtual host server. The domain name is then stored in a communication buffer utilized for communications between the server and the client. The virtual host quality of service program intercepts system calls that transport data through communication channels. When such a system call is made, the communication buffer being used to transport data through the channel is parsed. By parsing the buffer, the domain name to which the client is communicating is isolated, and hence the virtual host associated with the communication is identified. Quality of service guarantees appropriate for the virtual host are then set for the child process that made the system call. That child process proceeds to manage the communication between the virtual host and the client.

In all of the above described embodiments, the present invention allows providers of virtual host services to make appropriate quality of service guarantees to multiple virtual hosts without upgrading or replacing existing virtual host systems.

In another embodiment, the present invention comprises a stand alone virtual host system that sets appropriate quality of service guarantees for all virtual hosts. In such an embodiment, the present invention is in the form of a server application program. Unlike other embodiments of the present invention, in order to utilize this embodiment providers of virtual host services must upgrade their virtual host system.

In this embodiment, the virtual host server program stores in computer memory a table including appropriate quality of service guarantees. The server program then receives all client requests for communication with virtual hosts. When utilizing the fork after accept method, the server first receives a client request to communicate with a virtual host, and then creates a child process to manage communication between the virtual host and the client. Next, the server obtains the quality of service parameters associated with the virtual host, and guarantees, to the child process, the quality of service appropriate for the virtual host.

When utilizing the fork before accept method, the server first creates, a plurality of child processes to manage communication requests made to virtual hosts by clients. When the server receives a communication request made to a select one of the virtual hosts by a client, the server obtains the quality of service parameters associated with the virtual host, and guarantees the associated quality of service to the child process that will manage the communication.

As here summarized, the present invention makes appropriate quality of service guarantees to a plurality of virtual hosts comprising a single server application program. Of course, the present invention can also be utilized to make appropriate quality of service guarantees to a plurality of virtual processes of any nature comprising a single application program.

BRIEF DESCRIPTION OF THE DRAWINGS

FIG. 4A illustrates pointers inserted into the operating system. FIG. 4B illustrates copies of pointers to operating system calls saved to computer memory. FIG. 4C illustrates the content of object code inserted into the operating system. FIG. 4D illustrates the content of association tables.

FIG. 6A illustrates pointers inserted into the operating system. FIG. 6B illustrates copies of pointers to operating system calls saved to computer memory. FIG. 6C illustrates the content of object code inserted into the operating system.

DETAILED DESCRIPTION OF THE PREFERRED EMBODIMENTS

System Overview

Figure 1:
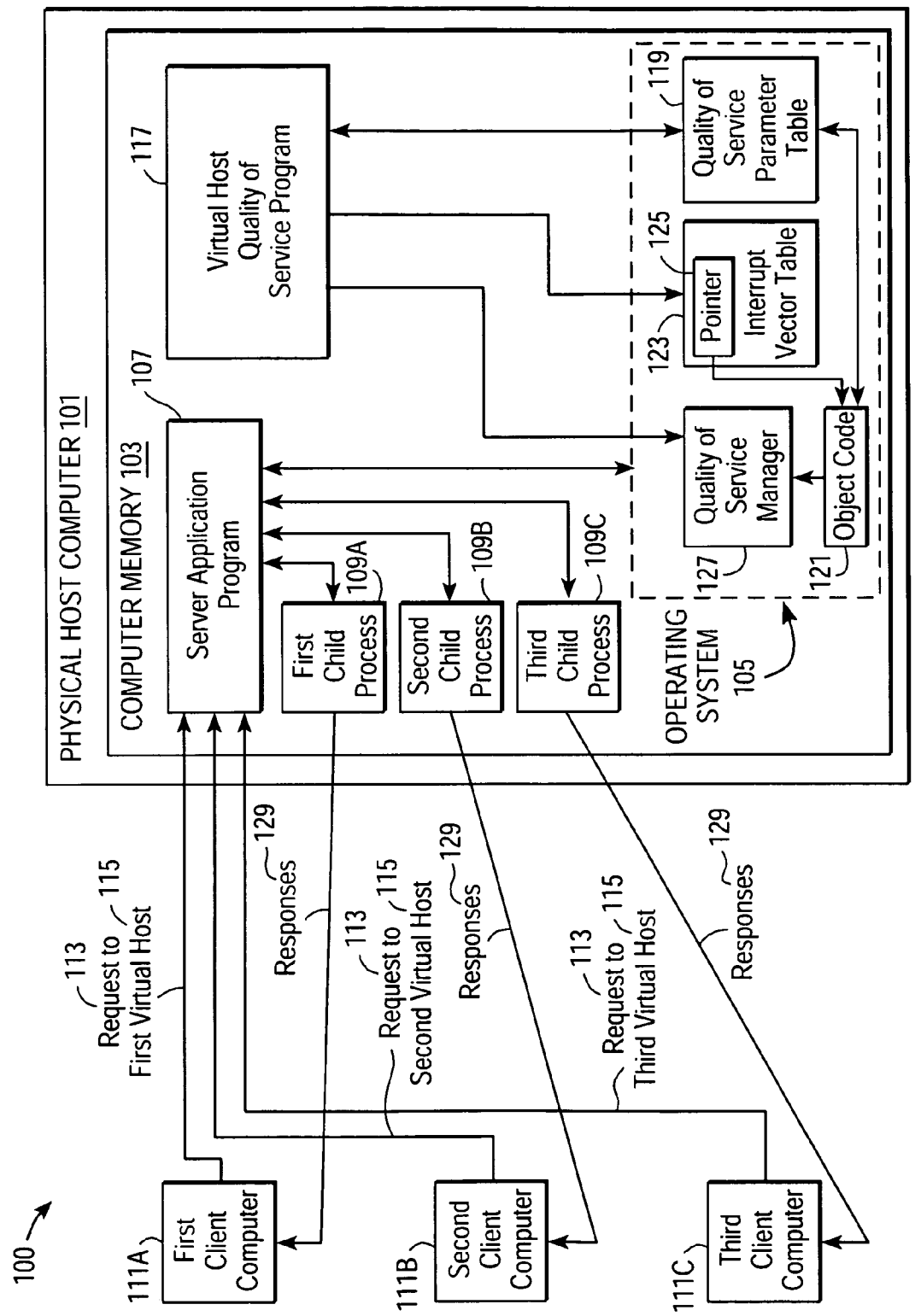
FIG. 1 is a block diagram illustrating a high level overview of a system for setting quality of service guarantees for virtual hosts in accordance with one embodiment of the present invention.

FIG. 1 presents a high level overview of a system for setting quality of service guarantees for virtual hosts in accordance with a preferred embodiment of the present invention. A single, physical host computer 101 contains computer memory 103, conventional processor(s), networking interfaces, and input/output devices (not shown). An operating system 105, a virtual host server application program 107, and a plurality of child processes 109 of the server application program 107 reside in the computer memory 103. For purposes of example, FIG. 1 illustrates three child processes 109 of the virtual host server application program 107: a first child process 109A, a second child process 109B, and a third child process 109C. It is to be understood that more or fewer child processes 109 can reside in the computer memory 103 as desired.

Client computers 111 send requests 113 to a plurality of virtual hosts 115 which are supported by the server 107. All such requests are received by the server application program 107 and are processed by the child processes 109. For purposes of example, FIG. 1 illustrates three client computers 111 (client computer 111A, client computer 111B, and client computer 111C), each making separate requests 113 to a separate virtual host 115. It is to be understood that more or fewer client computers 111 can make more or fewer requests 113 to more or fewer virtual hosts 115. It is to be understood that the clients 111 are typically remote from the server 107 and physical host computer 101.

A virtual host quality of service application program 117 executes in the computer memory 103 of the physical host computer 101. The virtual host quality of service application program 117 inserts a quality of service parameter table 119 and object code 121 into the operating system 105 in the computer memory 103. Additionally, the virtual host quality of service application program 117 inserts, into the interrupt vector table 123 of the operating system 105, a pointer 125 to the object code 121. The object code 121 reads the quality of service parameter table 119, and calls the quality of service manager 127 of the operating system 105 to set appropriate quality of service guarantees for the virtual hosts 115 serviced by the virtual host server application program 107. The virtual hosts 115 then transmit responses 129 to the client computers 111. The features and functionality depicted in FIG. 1 are described in detail below.

Figure 2:
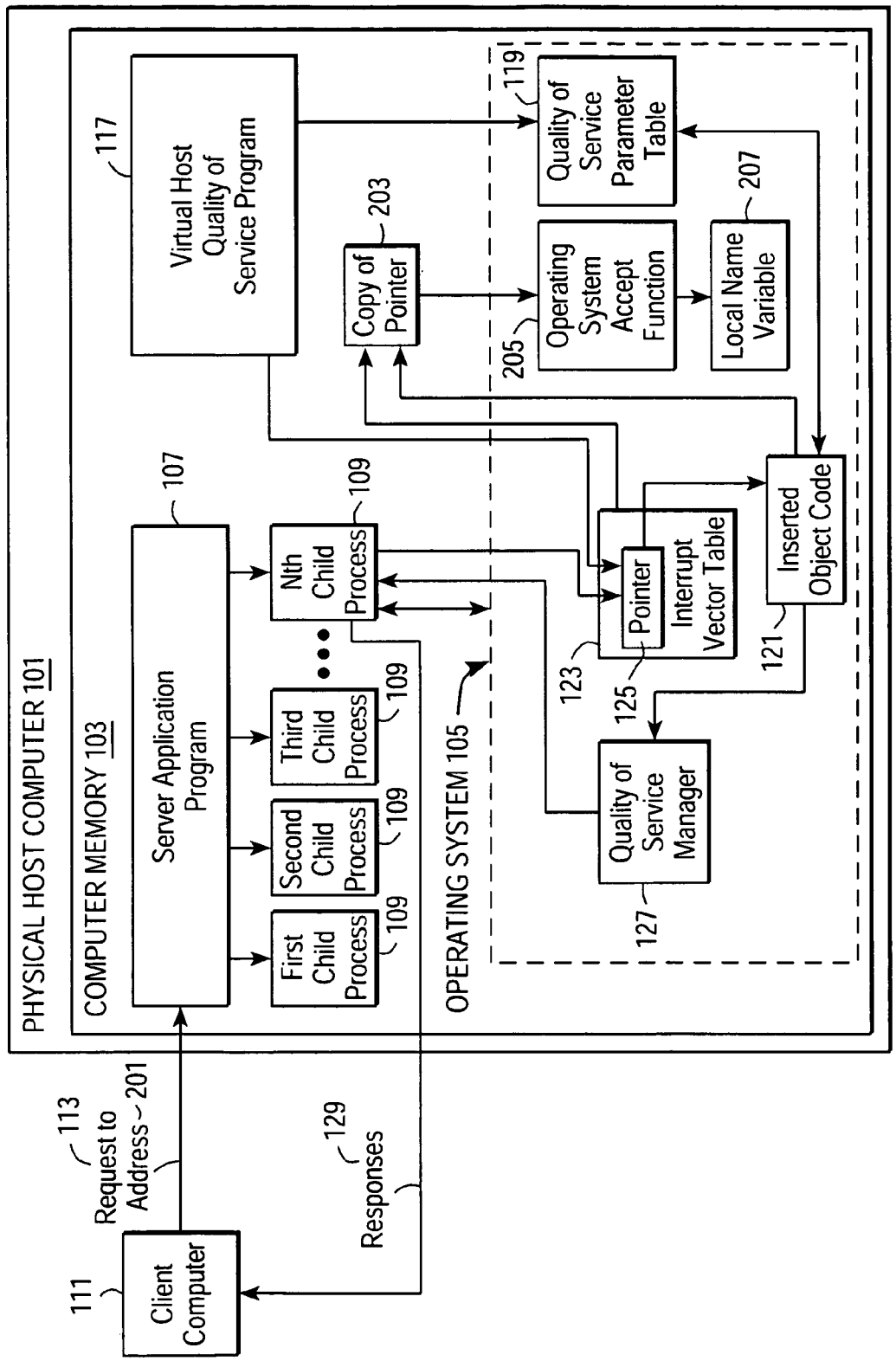
FIG. 2 is a block diagram illustrating a system for setting quality of service guarantees for virtual hosts of a virtual hosting system that utilizes a fork before accept method.

Providing Quality of Service Guarantees to
Network Address-Based Virtual Host Systems I. Virtual Host Systems Utilizing the Fork Before Accept Method FIG. 2 illustrates a virtual host application program 117 for providing quality of service guarantees to virtual hosts 115 of a server program 107 that utilizes the fork before accept virtual hosting method. As explained previously, clients 111 make requests 113 to specific virtual hosts 115. In a network address-based system, a virtual host 115 is identified by a network address 201. In other words, clients 111 transmit communication requests 113 to individual network addresses 201. Multiple network addresses 201 are assigned to the single, physical host computer 101, and communication requests thereto are serviced by the virtual host server program 107.

A virtual host server 107 that utilizes the fork before accept virtual hosting method generates a plurality of child processes 109, each of which waits for an incoming communication request 113. When a child process 109 receives a request 113, the child process 109 establishes a communication channel between itself and the requesting client 111. The child process 109 proceeds to use the communication channel to service the request 113 that was made by the client 111 to the network address 201.

During the time that the child process 109 services the communication request 113 to the specific network address 201, it is desirable for the child process 109 to be guaranteed a specific quality of service according to parameters for the virtual host 115 with which the network address 201 is associated. For this reason, the present invention detects when a child process 109 is accepting a communication request 113, and sets quality of service guarantees for the child process 109 based on parameters for the network address 201 to which the request 113 is directed. When the child process 109 finishes a communication session initiated by a request 113 to a specific network address 201, the child process 109 closes the established communication channel and waits for another incoming request 113. The next request 113 the child process 109 receives may be directed to a different network address 201 and hence may require that different quality of service parameters be set for the child process 109. Therefore, the present invention detects when the child process 109 establishes a communication channel to service the new request 113 and proceeds to request appropriate quality of service guarantees for the target network address 201.

In the embodiment of the present invention depicted in FIG. 2, a virtual host quality of service application program 117 executes in the computer memory 103. The quality of service program 117 inserts a quality of service parameter table 119 into the operating system 105 of the host computer 101. The quality of service table 119 contains quality of service parameters for each network address 201 associated with one of the virtual hosts 115 serviced by the virtual host server 107. The quality of service program 117 utilizes techniques known in the art to insert the table 119 into the operating system 105. In a preferred embodiment, the present invention dynamically links a module to an operating system kernel, while the kernel is active. The module is preferably in the form of object code comprising an empty quality of service table 119, and subroutines to add, modify, and delete quality of service parameters for different virtual hosts. The quality of service application program 117 then calls the appropriate subroutine to add the quality of service parameters for the virtual hosts 115 serviced by the server program 107. The quality of service program 117 utilizes the subroutines to add, modify, and delete quality of service parameters as desired. In alternative embodiments, the module contains additional subroutines, or only a subset of the subroutines listed above. In one alternative embodiment, the table 119 is first filled with quality of service parameters and then linked to kernel as a module. In an alternative embodiment, the quality of service table 119 is stored outside of the operating system 105 in computer memory 103.

The quality of service program 117 also inserts object code 121 into the operating system 105. Preferably, the object code is dynamically linked to the operating system kernel as a module. The contents and execution of the object code 121 are discussed in detail below. In an alternative embodiment, the object code 121 resides outside of the operating system 105 in computer memory 103. The quality of service program 117 makes a copy 203 of an internal operating system pointer to the operating system function that is called to establish a communication channel. In an alternative embodiment, the copy 203 is made by a module linked to the operating system kernel. In the UNIX operating system, this function is the operating system accept function 205, as pictured in FIG. 2. The copy 203 of the pointer to the system accept function 205 is stored in conventional computer memory 103. In another embodiment, the copy 203 of the pointer is stored in the operating system 105.

It is to be understood that the name of the system function that is called to establish a communication channel can vary from operating system to operating system. The present invention is not limited to any specific operating system, or to any specific operating system function name. Furthermore, some operating systems include more than one function that establishes a communication channel. Embodiments of the present invention targeted for such operating systems create copies 203 of the pointers to all such operating system functions.

The pointer to the system accept function 205 is located in the operating system 105 interrupt vector table 123. It is to be understood that the term "interrupt vector table" as used herein denotes an area in operating system memory in which are stored the addresses of operating system functions (system calls). In the UNIX operating system, this part of the operating system is called the "interrupt vector table," and that term is used in this specification. Other operating systems employ different terminology to denote the same system component. An interrupt vector table by any other name is still within the scope of the present invention.

The quality of service program 117 replaces the pointer to the system accept function 205 with a pointer 125 to the inserted object code 121, such that when the system accept function 205 is called, the inserted object code 121 is executed instead. In another embodiment, this pointer replacement is executed by a module linked to the operating system 105 kernel. Executing alternative code when a system call is made comprises intercepting the system call. The steps of inserting object code 121 into the operating system 105, making a copy 203 of an operating system pointer, and replacing the operating system pointer with a pointer 125 to the inserted object code facilitate interception of a system call.

When a call is made to the system accept function 205, the operating system 105 uses the pointer 125 in the interrupt vector table 123 to execute the object code 121. The object code 121 first utilizes the saved copy 203 of the pointer to the system accept function 205 to call the system accept function 205. The system accept function 205 executes, thereby establishing the communication channel. When the accept function 205 terminates, the object code 121 continues to execute. The object code 121 determines if the communication channel that was established is to one of the network addresses 201 associated with one of the virtual hosts 115 serviced by the server program 107. Preferably, this determination is made by reading an operating system variable 207 that identifies the network address 201 associated with the communication channel. In UNIX, this system variable 207 is called "local_name," and is set by the accept function 205. In other operating systems the variable 207 is denoted by a different name. Alternative embodiments of the present invention utilize other methods to determine the network address 201 to which the communication channel was established, for example reading a return value of a system function, polling a system communication manager, or other similar mechanisms as desired.

Where the communication channel that was established is not to one of the network addresses 201 associated with one of the virtual hosts 115, the object code 121 simply exits. The channel will not be used for communication to a virtual host 115, and thus no quality of service guarantees need to be made by the present invention. Where the communication channel is to one of the network addresses 201 associated with one of the virtual hosts 115, the object code 121 requests, from the operating system 105, an appropriate quality of service guarantee for the process that called the system accept function 205.

To set the quality of service guarantees, the object code 121 reads the quality of service table 119, and locates the quality of service parameters for the virtual host 115 associated with the network address 201 to which the communication channel was established. The object code 121 then calls the operating system quality of service manager 127 to request an appropriate quality of service guarantee to the child process 109 that called the system accept function 205. The appropriate quality of service to guarantee is that specified by the quality of service parameters for the virtual host 115 to which the communication channel has been established. Once the quality of service guarantee has been requested, the object code 121 exits, and the child process 109 sends a response 129 to the client 111 via the established communication channel. Communication between the client 111 and the virtual host 115 proceeds over the communication channel. The communication is managed by the child process 109, which has been guaranteed appropriate quality of service.

II. Virtual Host Systems Utilizing the Fork After Accept Method

Figure 3:
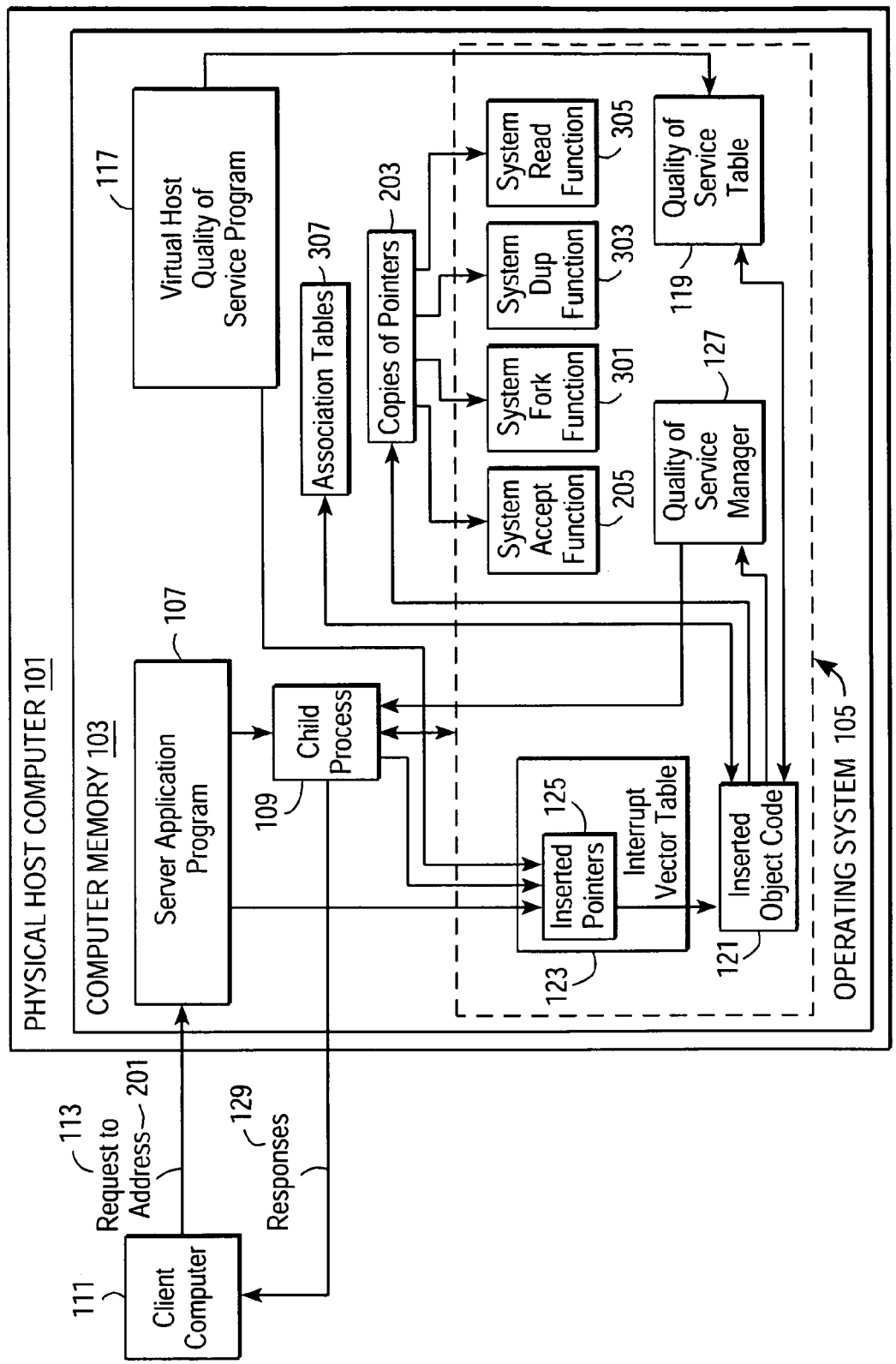
FIG. 3 is a block diagram illustrating a system for setting quality of service guarantees for virtual hosts of a virtual hosting system that utilizes a fork after accept method.

FIG. 3 illustrates a virtual host application program 117 for providing quality of service guarantees to virtual hosts 115 of a server program 107 that utilizes the fork after accept virtual hosting method. As explained previously, communication requests 113 to specific network addresses 201 are made by client computers 111 and are serviced by the virtual host server program 107. A virtual host server 107 that utilizes the fork after accept virtual hosting method accepts a communication request 113, establishes a communication channel between the client computer 111 and the network address 201, and then generates a child process 109. The child process 109 uses the communication channel created by the server 107 to service the request 113 that was made by the client 111 to the network address 201. During the time that the child process 109 services the communication request 113 to the specific network address 201, it is desirable for the child process 109 to be guaranteed quality of service according to parameters for the virtual host 115 with which the network address 201 is associated.

In the embodiment of the present invention depicted in FIG. 3, a virtual host quality of service program 117 executes in the computer memory 103. The quality of service program 117 inserts a quality of service parameter table 119 and object code 121 into the operating system 105 of the host computer 101, in the manner described above. As described above, preferably the object code is dynamically linked to the operating system kernel as a module. The contents and execution of the object code 121 are discussed in detail below.

The quality of service program 117 makes copies 203 of multiple internal operating system pointers to operating system functions. In an alternative embodiment, the copies 203 are made by a module linked to the operating system kernel. The present invention makes copies 203 of the pointers to the following operating system functions: system functions to establish a communication channel (for example, the UNIX accept function) 205, system functions to generate a child process (for example, the UNIX fork function) 301, system functions to copy a file or a file descriptor (for example, the UNIX dup and dup2 functions), and system functions to read data from a file (for example, the UNIX read function). The copies 203 of the pointers to the system functions are preferably stored in conventional computer memory 103. Alternatively, the copies 203 are stored in the operating system 105.

It is to be understood that the names of the relevant system functions can vary from operating system to operating system. The present invention is not limited to any specific operating system, or to any specific operating system function names. Furthermore, some operating systems include more than one function which performs the above described functionality. Embodiments of the present invention targeted for such operating systems create copies 203 of the pointers to the appropriate operating system functions. For purposes of example, this specification refers to the system accept function 205, the system fork function 301, the system dup function 303, and the system read function 305, as depicted in FIG. 3. It is to be understood that references to the system accept function 205 apply to all system functions to establish a communication channel, references to the system fork function 301 apply to all system functions to generate a child process, references to the system dup function 303 apply to all system functions to copy a file or to copy a file descriptor, and references to the system read function 305 apply to all system functions to read data from a file or to read data from a communication channel.

The pointers to the above listed system functions are located in the operating system 105 interrupt vector table 123. The quality of service program 117 replaces the pointers with pointers 125 to inserted object code 121, such that when a targeted system function is called, inserted object code 121 is executed instead. In an alternative embodiment, the replacement is executed by a module linked to the operating system kernel. The embodiment of the present invention depicted in FIG. 3 intercepts the system accept function 205, the system fork function 301, the system dup function 303 and the system read function 305.

Figure 4D:
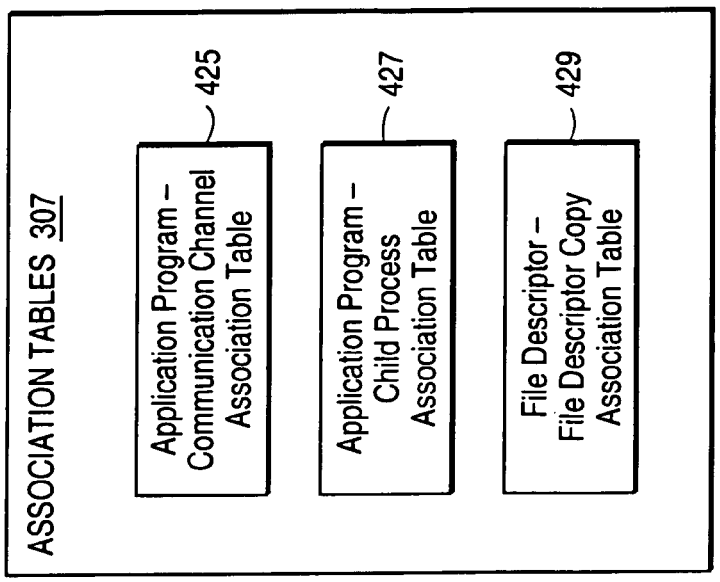
FIG. 4A, FIG. 4B, FIG. 4C, and FIG. 4D are block diagrams illustrating, in greater detail, select features depicted in FIG. 3.
Figure 4A:
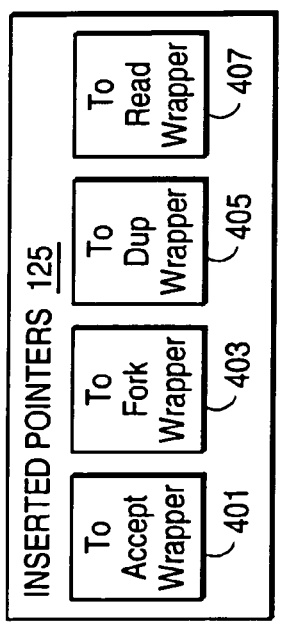
Figure 4B:
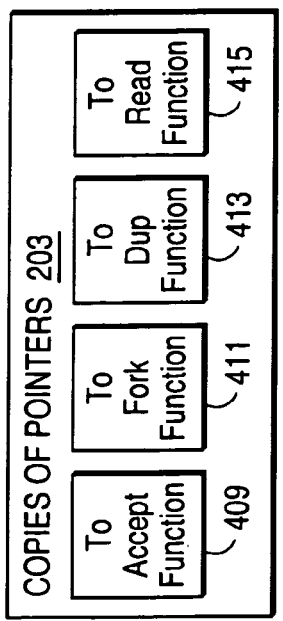
Figure 4C:
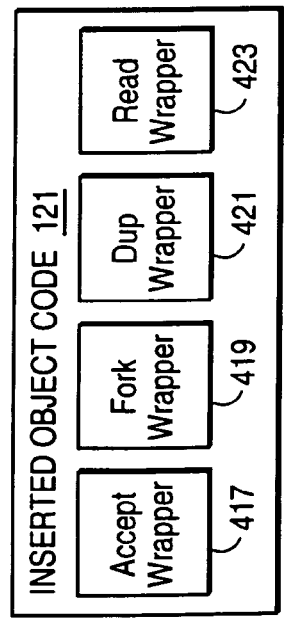

When a call is made to an intercepted function 205, inserted object code 121 executes. This inserted object code 121 is called as a wrapper. For example, the accept wrapper is the inserted object code 121 that executes when the system accept function 205 is called. FIG. 4C illustrates the content of the inserted object code 121 in the embodiment of FIG. 3. The object code 121 contains an accept wrapper 417, a fork wrapper 419, a dup wrapper 421, and a read wrapper 423. FIG. 4A illustrates pointers 125 inserted into the interrupt vector table: a pointer 401 to the accept wrapper 417, a pointer 403 to the fork wrapper 419, a pointer 405 to the dup wrapper 421, and a pointer 407 to the read wrapper 423. FIG. 4B illustrates the copies 203 of pointers: a copy of the pointer 409 to the system accept function 205, a copy of the pointer 411 to the system fork function 301, a copy of the pointer 413 to the system dup function 303, a copy of the pointer 415 to the system read function 305.

Returning to FIG. 3, whenever a process establishes a communication channel, the accept wrapper 417 executes. The accept wrapper 417 first utilizes the saved copy of the pointer 409 to the system accept function 205 to call the system accept function 205. The system accept function 205 executes, thereby establishing the communication channel. When the accept function 205 terminates, the accept wrapper 417 continues to execute. The accept wrapper 417 determines if the communication channel that was established is to one of the network addresses 201 associated with one of the virtual hosts 115 serviced by the server program 107. As described above, this determination is preferably made by reading an operating system variable 207 that identifies the network address 201 associated with the communication channel.

Where the communication channel that was established is not to one of the network addresses 201 associated with one of the virtual hosts 115, the accept wrapper 417 exits. The channel will not be used for communication to a virtual host 115, and thus no quality of service guarantees need to be made by the present invention. Where the communication channel is to one of the network addresses 201 associated with one of the virtual hosts 115, the present invention requests an appropriate quality of service guarantee for the child process 109 that will manage the communication. Because the child process 109 has not yet been generated by the server application 107, the present invention stores select information in a set of association tables 307. The information stored will allow the present invention to later identify the child process 109 managing the communication, and set appropriate quality of service for that child process 109. Preferably, the association tables 307 reside in conventional computer memory 103. In alternative embodiments, the association tables are inserted into the operating system 105. FIG. 4D illustrates the content of one embodiment of the association tables 307. Preferably, there are three association tables: an application program-communication channel association table 425, an application program-child process association table 427, and a file descriptor-file descriptor copy association table 429.

Returning to FIG. 3, the accept wrapper 417 isolates an identifier of the process that established the communication channel. Preferably, the identifier comprises an operating system 105 assigned process identification (PID) of the process that called the accept function 205. The accept wrapper 417 also isolates an identifier of the communication channel itself. In UNIX, as well as in many other operating systems, a communication channel (socket) is identified by a file descriptor. Embodiments of the present invention targeted for such operating systems isolate the file descriptor associated with the communication channel. Other operating systems employ alternative mechanisms to identify a communication channel, and corresponding embodiments of the present invention isolate appropriate identifiers accordingly.

The present invention stores, in the application program-communication channel association table 425, the process identifier, the file descriptor (or alternatively other identifier) associated with the communication channel, and the network address 201 to which the communication channel was established. Thus, the application program-communication channel association table 425 contains, for each communication channel established to one of the network addresses 201 associated with one of the virtual hosts 115, a record that a specific process established a specific communication channel between a client 111 and a specific network address 201. Once these associations are stored, the accept wrapper 417 exits.

Recall that a virtual host server 107 that utilizes the fork after accept method will, after establishing a communication channel between a client 111 and a virtual host 115, generate a child process 109 to manage the communication. Whenever any application generates a child process 109, the fork wrapper 419 executes. The fork wrapper 419 first uses the copy of the pointer 403 to the system fork function 301 to call the system fork function 301. The system fork function 301 executes and generates a child process 109. When the system fork function 301 exits, the fork wrapper 419 continues to execute. The fork wrapper 419 stores, in the application program-child process association table 427, the process identification (or alternative identifier) for the application program that called the system fork function 301, as well as the process identification (or alternative identifier) for the generated child process 109. Thus, the application program-child process association table 427 contains associations between all application programs and all child processes 109 thereof.

Whenever any process copies a file, or a descriptor of a file, the dup wrapper 421 executes. The dup wrapper 421 utilizes the copy of the pointer 413 to the system dup function 303 to execute the system dup function 303. The system dup function 303 executes and creates a copy of a file (or a copy of a file descriptor). When the system dup function 303 exits, the dup wrapper 421 continues to execute. The dup wrapper 421 stores, in the file descriptor-file descriptor copy association table 429, the association between the file descriptor of the file copied by the system dup function 303 and the file descriptor of the copy thereof. Where only a file descriptor was copied by the system dup function 303, the dup wrapper 421 stores the association between the source file descriptor and the copy of the source file descriptor. Thus, for every copied file descriptor, the file descriptor-file descriptor copy association table 429 contains an association between the original file descriptor and the copy thereof.

Whenever a process calls the system read function 305, the read wrapper 423 executes. The read wrapper 423 checks the association tables 307 to determine whether the process that called the system read function 305 is a child process 109 of an application program that established a communication channel to a virtual host 115. To make this determination, the read wrapper 423 first checks the application program-child process association table 427 to determine if the process that called the system read function 305 is a child process 109 of another process. If the process that called the system read function 305 is a child process 109, the read wrapper 423 checks the application program-communication channel association table 425 to determine if the parent process established a communication channel to a network address 201 associated with one of the virtual hosts 115.

If the process that called the system read function 305 is a child process 109 of a parent process that established a communication channel to a virtual host 115, the read wrapper 423 determines if the child process 109 called the system read function 305 in order to read from the communication channel to the virtual host 115 established by the parent process. To make this determination, the read wrapper 423 compares the file descriptor that the system read function 305 was called to read from with the file descriptor, in the application program-communication channel association table 425, associated with the communication channel established by the parent process to the virtual host 115.

If the file descriptor of the read function 305 is not identical to the file descriptor associated with the communication channel, the read wrapper 423 checks the file descriptor-file descriptor copy association table 429 to determine whether the file descriptor is a copy of the file descriptor associated with the communication channel. Recall that the file descriptor-file descriptor copy association table 429 contains associations between all file descriptors and copies thereof. The read wrapper 423 examines the table to determine whether the file descriptor is a copy of another file descriptor, and if so whether the source file descriptor is the descriptor associated with the communication channel to the virtual host 115 established by the parent process.

If the file descriptor is the descriptor of the communication channel (or a copy thereof) the read wrapper 423 examines the application program communication channel association table 425 to determine to which network address 201 the communication channel was established by the server program 107.

If the process that called the system read function 305 is not a child process 109 of an application program that established a communication channel to a virtual host 115, or if the process is not reading from the communication channel to a virtual host 115 established by the parent process, the read wrapper 423 uses the copy of the pointer 415 to the system read function 305 to call the system read function 305, which proceeds to execute. If, on the other hand, the process that called the system read function 305 is a child process 109 of an application program that established a communication channel to a virtual host 115, and the process is reading from the communication channel to a virtual host 115 established by the parent process, the read wrapper 423 proceeds to set appropriate quality of service guarantees for the child process 109.

To set the quality of service guarantees, the read wrapper 423 reads the quality of service table 119, and locates the quality of service parameters for the virtual host 115 associated with the network address 201 to which the communication channel was established. The read wrapper 423 then calls the quality of service manager 127 to request an appropriate quality of service guarantee to the child process 109 that called the system read function 305. Once the quality of service guarantee has been requested, the read wrapper 423 utilizes the copy of the pointer 415 to the system read function 305 to call the system read function 305. The system read function 305 proceeds to read data from the communication channel. Then, the child process 109, which has been guaranteed appropriate quality of service, continues to manage communication between the client 111 and the virtual host 115 over the communication channel.

It is to be understood that in various embodiments of the present invention, the quality of service application program 117 intercepts not only the system read function 305, but other system functions that transport data through a communication channel. For example, different embodiments intercept a system write function, a system transport function, and other such functions as desired. The present invention includes in its scope intercepting any system function which transports data through a communication channel, and proceeding to set quality of service parameters for a child process in the manner detailed above in the description of intercepting the system read function 305.

Providing Quality of Service Guarantees to Name-Based Virtual Host Systems

Figure 5:
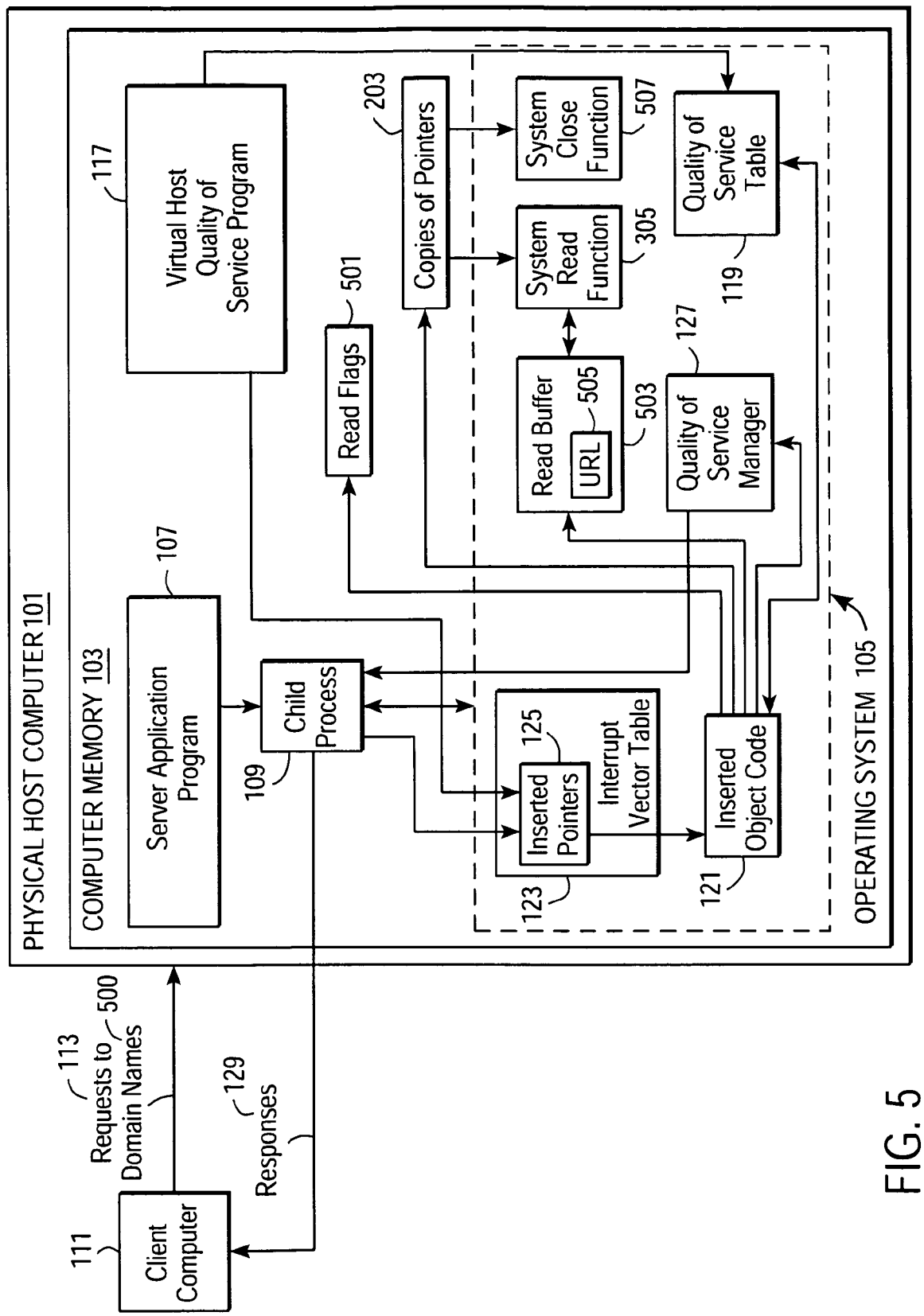
FIG. 5 is a block diagram illustrating a system for setting quality of service guarantees for virtual hosts of a name-based virtual hosting system according to one embodiment of the present invention.

FIG. 5 illustrates a virtual host application program 117 for providing quality of service guarantees to virtual hosts 115 of a name-based virtual hosting system. As explained previously, in a name-based system a virtual host 115 is identified not by a network address 201, but instead by a domain name 500. Thus, clients 111 transmit communication requests 113 to individual domain names 500. Multiple such domain names 500 are assigned to the single, physical host computer 101, and communication requests thereto are serviced by the virtual host server program 107.

In the embodiment of the present invention depicted in FIG. 5, a virtual host quality of service application program 117 executes in the computer memory 103 of the single, physical host computer 101. As in the embodiments of FIGS. 2 and 3, the quality of service program 117 inserts a quality of service parameter table 119 into the operating system 105 of the host computer 101. In the embodiment of FIG. 5, the quality of service table 119 contains quality of service parameters for each domain name 500 associated with one of the virtual hosts 115 serviced by the virtual host server 107. As in the embodiments of FIGS. 2 and 3, the quality of service program 117 also inserts object code 121 into the operating system 105. The nature of this object code 121 is explained in detail later in this specification. As in the embodiments of FIGS. 2 and 3, the quality of service table 119, the object code 121, or both are alternatively stored in conventional computer memory 103.

The quality of service program 117 makes copies 203 of multiple internal operating system pointers to operating system functions. The program 117 makes copies 203 of pointers to the following operating system functions: the system functions to read data from a file (for example, the UNIX read function) and the system functions to close a file (for example, the UNIX close function). The copies 203 of the pointers to the system functions are preferably stored in conventional computer memory 103. Alternatively, the copies 203 of the pointers are inserted into the operating system 105. As explained above, it is to be understood that alternative embodiments of the present invention create copies 203 of pointers to other operating system functions as desired.

The pointers to the above listed system functions are located in the operating system 105 interrupt vector table 123. The quality of service program 117 (or alternatively a module linked to the operating system kernel) replaces the pointers with pointers 125 to inserted object code 121, such that when a targeted system function is called, inserted object code 121 is executed instead. The embodiment of the present invention depicted in FIG. 5 intercepts the system read function 305, and the system close function.

Figure 6A:
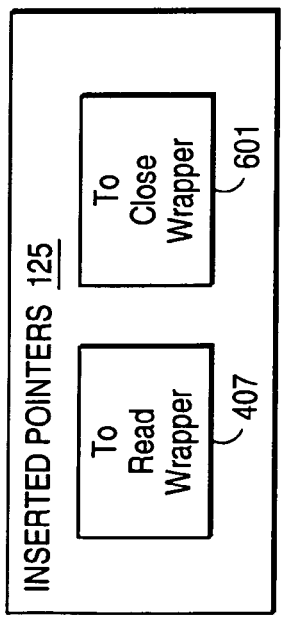
FIG. 6A, FIG. 6B, and FIG. 6C are block diagrams illustrating, in greater detail, select features depicted in FIG. 5.
Figure 6B:
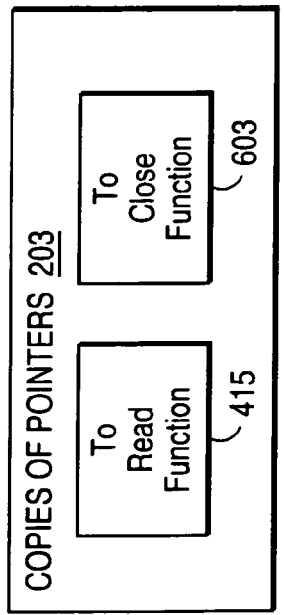
Figure 6C:
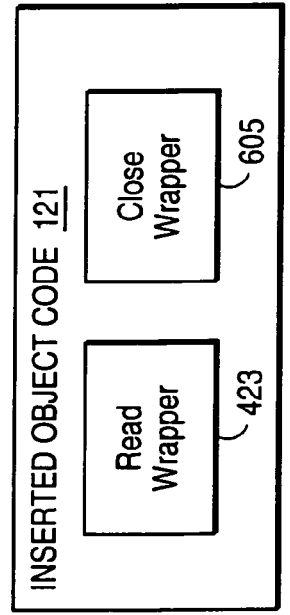

When a call is made to an intercepted function 205, inserted object code 121 executes. As explained earlier in this specification, this inserted object code 121 is known as a wrapper. FIG. 6C illustrates the content of the inserted object code 121 in the embodiment of the present invention depicted in FIG. 5. The inserted object code contains a read wrapper 423 and a close wrapper 605. FIG. 6A illustrates the pointers 125 inserted into the interrupt vector table 123: a pointer 407 to the read wrapper 423 and a pointer 601 to the close wrapper 605. FIG. 6B illustrates the copies 203 of pointers: a copy of the pointer 415 to the system read function 305 and a copy of the pointer 603 to the system close function 507.

Returning to FIG. 5, whenever a process calls the system read function 305, the read wrapper 423 executes. The read wrapper 423 uses the copy of the pointer 415 to the system read function 305 to call the system read function 305. The system read function 305 executes and reads data from a file descriptor. When the system read function 305 terminates, the read wrapper 423 resumes execution. The read wrapper 423 proceeds to determine if appropriate quality of service has already been guaranteed for the process that called the system read function 305. To make this determination, the read wrapper 423 examines a plurality of read flags 501, which may be stored in conventional computer memory 103 or inserted into the operating system 105. Each read flag 501 contains an identifier of a process (preferably a PID), an identifier of a communication channel (preferably a file descriptor), and an indication (flag) of whether quality of service has been guaranteed to the identified process for servicing communication via the channel. The read wrapper 423 examines the read flags 501 to determine whether appropriate quality of service has already been set for the combination of the process that called the read function 423 and the file descriptor from which that process is attempting to read data. If quality of service has already been set, the read wrapper 423 simply exits. On the other hand, if quality of service has not been set, the read wrapper 423 determines if the process is servicing a virtual host 115.

To so determine, the read wrapper 423 parses a read buffer 503 returned by the system read function 305. The read buffer 503 contains the name 505 of the file (or file equivalent, such as communication channel) from which the system read function 305 read data. The read wrapper 423 isolates this name 505 and compares it to the domain names 500 of the virtual hosts 115. If the name 505 is not a domain name 500 of a virtual host 115, the read wrapper 423 exits. The system read function 305 was not called to read data across a communication channel between a client 111 and virtual host 115, so the read wrapper 423 need not set quality of service for the process that called the read function 305. However, if the name 505 from the read buffer 503 is the domain name 500 of a virtual host 115, the read wrapper 423 must set quality of service guarantees for the process that called the read function 305.

To set the quality of service guarantees, the read wrapper 423 reads the quality of service table 119, and locates the quality of service parameters for the virtual host 115 associated with the name 505 from the read buffer 503. The read wrapper 423 then calls the quality of service manager 127 to request an appropriate quality of service guarantee to the process 109 that called the system read function 305. The read wrapper 423 then exits. The process 109 which called the system read function 305, which has been guaranteed appropriate quality of service, continues to manage communication between the client 111 and the virtual host 15 over the communication channel. It is to be understood that, as explained above, various embodiments of the present invention intercept various system calls that perform identical or similar tasks.

Whenever a process calls the system close function 507, the close wrapper 605 executes. The close wrapper 605 uses the copy of the pointer 603 to the system close function 507 to call the system close function 507. The system close function 507 executes and closes the file. When the system close function 507 terminates, the close wrapper 605 resumes execution. The close wrapper 605 checks the plurality of read flags 501 for a flag concerning the combination of the process that called the close function 507 and the file descriptor of the file that the process is attempting to close. If there is no read flag 501 for the combination, the close wrapper 605 simply exits. The combination is not one pertaining to virtual host 115 communication, and the close wrapper 605 need not adjust the read flags 501. On the other hand, if a read flag 501 exists for the combination, the close wrapper 605 modifies it to indicate that quality of service has not been set for the combination. This is useful because the process that called the close function 507 may later utilize the same file descriptor to manage communication between a client 111 and a different virtual host 115, requiring a different quality of service guarantee. Thus, it is useful that the read flag 501 indicates quality of service is not set.

Figure 7:
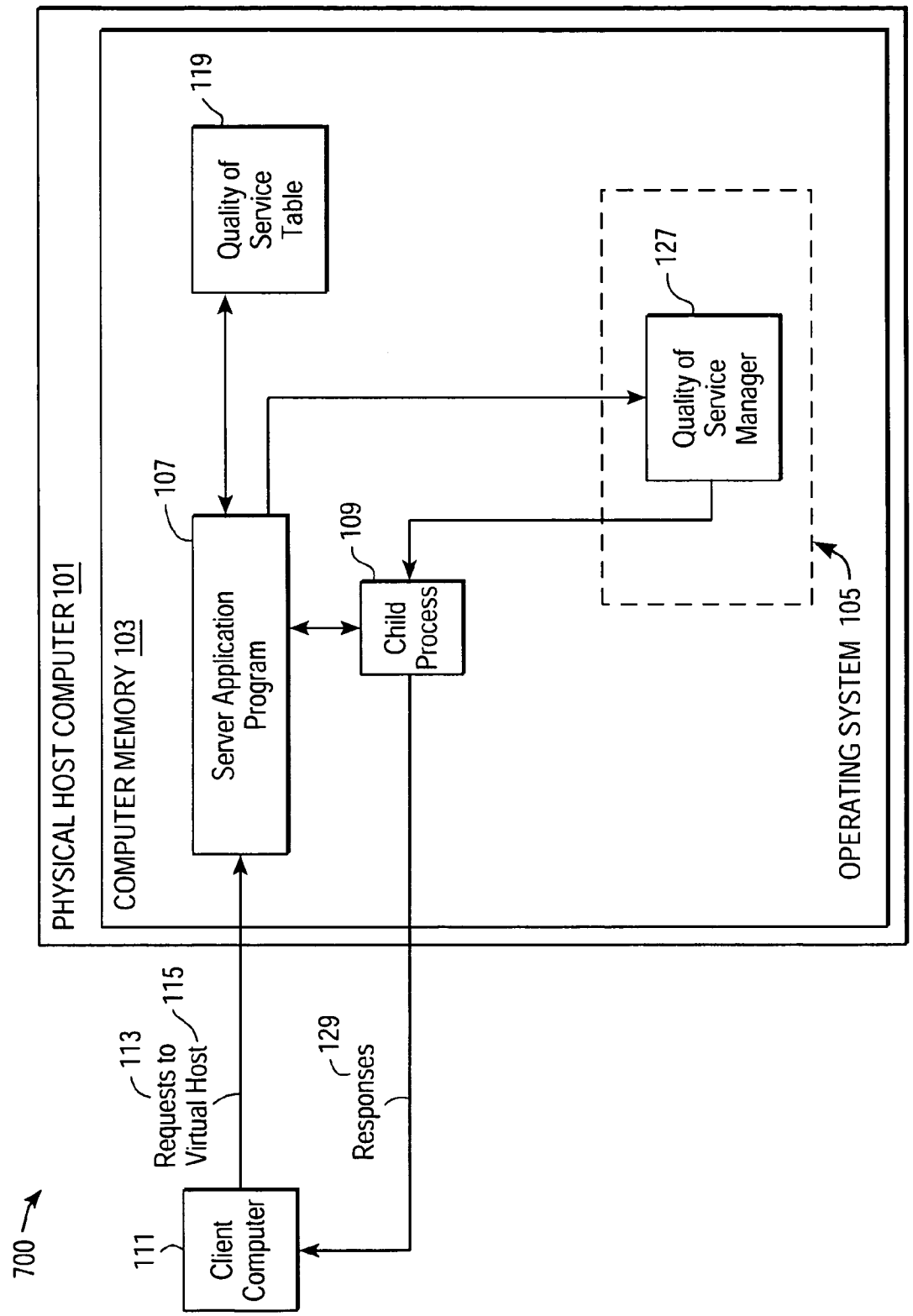
FIG. 7 is a block diagram illustrating an embodiment in which the present invention comprises a stand alone virtual host system.

Providing Quality of Service Guarantees to Virtual Host Systems by a Stand Alone Server Application Program FIG. 7 illustrates an embodiment in which the present invention comprises a stand alone virtual host system 700 that sets appropriate quality of service guarantees for the virtual hosts 115 which it services. In the embodiment of FIG. 7, the present invention is in the form of a server application program 107 executing in the computer memory 103 of a stand alone host computer 101. The server program 107 stores a quality of service table 119 in computer memory 103. The table 119 contains quality of service parameters for all of the virtual hosts 115 serviced by the system. All client 111 requests 113 for communication with virtual hosts 115 are received by the server program 107.

When utilizing the fork after accept method, the server program 107 first receives a client 111 request 113 to communicate with a virtual host 115 and then creates a child process 109 to manage communication between the virtual host 115 and the client 109. Next, the server program 107 obtains the quality of service parameters associated with the virtual host 115 from the quality of service table 119. The server application program 107 then calls the operating system quality of service manager 127 to request an appropriate quality of service guarantee for the child process 109. The child process 109 proceeds to manage the communication between the client 111 and the virtual host 115.

When utilizing the fork before accept method, the server program 107 first creates a plurality of child processes 109 to manage communication requests 113 made to virtual hosts 115 by clients 111. When the server program 107 receives a communication request 113 made to a select one of the virtual hosts 115 by a client 111, the server program 107 obtains the quality of service parameters associated with the virtual host 115 from the quality of service table 119. The server program 107 then calls the operating system quality of service manager 127 to request an appropriate quality of service guarantee for the child process 109. The child process 109 proceeds to manage the communication between the client 111 and the virtual host 115.

It is to be understood that the present invention is not limited to guaranteeing appropriate quality of service to a plurality of virtual hosts. The present invention can be utilized to make appropriate quality of service guarantees to a plurality of virtual processes of any nature.

What is claimed is:

1. A computer-implemented method for providing a quality of service guarantee to a child process of an application program, wherein the application program and its child process service requests made to a plurality of network addresses, a network address indicating a virtual host, a virtual host comprising a virtualized server application program the method comprising:

storing a quality of service parameter associated with a network address;
   intercepting a system call, made by the child process, that establishes a communication channel between a client and the network address, wherein intercepting the system call comprises:
      saving a copy of a first pointer, which Points to object code of the system call; and
      replacing the first pointer with a second pointer, which points to different object code, such that making the system call causes the different object code to execute; and
   enabling communication between the network address and the client, the communication being managed by the child process;
   wherein execution of the different object code comprises:
      using the saved copy of the first pointer to transfer execution to the intercepted system call, thereby establishing a communication channel;
      determining that the established communication channel is to one of the plurality of network addresses serviced by the application program and its child process;
      obtaining a quality of service parameter associated with the network address; and
      utilizing an operating system resource to request a guarantee, to the child process, of a quality of service according to the obtained quality of service parameter.

2. A computer-implemented method for providing a quality of service guarantee to a child process of an application program, wherein the application program and its child process service requests made to a plurality of network addresses, a network address indicating a virtual host, a virtual host comprising a virtualized server application program, the method comprising:

storing a quality of service parameter associated with a network address;
   intercepting a system call which establishes a communication channel between a client and the network address;
   allowing establishment of the communication channel;
   storing an indicator of an association between an application program that made the intercepted system call, the established communication channel, and the network address;
   intercepting a system call which creates a child process;
   allowing creation of the child process;
   storing an indicator of an association between an application program that made the intercepted system call and the created child process;
   intercepting a system call which creates a copy of a file descriptor;
   allowing creation of the copy of the file descriptor;
   storing an indicator of an association between the file descriptor and the created copy of the file descriptor;
   intercepting a system call which transports data through a communication channel;
   determining, by examining the stored association indicators, that an application that made the intercepted system call is a child process of a parent application that established a communication channel to one the network address;
   determining, by examining the stored association indicators, that the communication channel through which the intercepted system call transports data is the communication channel established by the parent application to the network address;
   obtaining the quality of service parameter associated with the network address;
   utilizing an operating system resource to request a guarantee, to the child process that called the intercepted system call, of a quality of service according to the obtained quality of service parameter associated with the network address; and
   allowing data to be transported through the communication channel.

3. The method of claim 2 wherein storing the quality of service parameter associated with the network address comprises modifying an operating system to include a quality of service parameter table comprising the quality of service parameter associated with the network address.

4. The method of claim 3 wherein modifying the operating system comprises linking a module to an operating system kernel, the module comprising the quality of service parameter table.

5. The method of claim 2 further comprising:
   saving a copy of a first pointer, which points to object code of the system call to intercept; and
   wherein intercepting the system call comprises replacing the first pointer with a second pointer, which points to different object code, such that making the system call causes the different object code to execute.

6. The method of claim 5, wherein the intercepted system call comprises a system call which establishes a communication channel between a client and a network address, and wherein execution of the different object code comprises:
   allowing establishment of the communication channel by using the saved copy of the first pointer to transfer execution to the intercepted system call; and
   storing an association between the application program and the established communication channel by storing, in an association table, an entry indicating an association between a process identification number of the application program that made the system call, a file descriptor describing the established communication channel, and the network address to which the channel was established.

7. The method of claim 5, wherein the intercepted system call comprises a system call which creates a child process, and wherein execution of the different object code comprises:
   allowing creation of the child process by using the saved copy of the first pointer to transfer execution to the intercepted system call; and
   storing an association between the application program that called the system call and the created child process by storing, in an association table, an entry indicating an association between a process identification number of the application program that made the system call and a process identification number of the created child process.

8. The method of claim 5 further comprising inserting the different object code into the operating system.

9. The method of claim 7 wherein inserting the different object code into the operating system comprises linking a module to an operating system kernel, the module comprising the different object code.

10. A computer-readable medium storing a computer program product for providing a quality of service guarantee to a child process of an application program, wherein the application program and its child process service requests made to a plurality of network addresses, a network address indicating a virtual host, a virtual host comprising a virtualized server application program, the computer program product comprising:
    program code for storing a quality of service parameter associated with a network address;
    program code for intercepting a system call, made by the child process, that establishes a communication channel between a client and the network address, wherein the program code for intercepting the system call comprises:
        program code for saving a copy of a first pointer, which points to object code of the system call; and
        program code for replacing the first pointer with a second pointer, which points to different object code, such that making the system call causes the different object code to execute; and
    program code for enabling communication between the network address and the client, the communication being managed by the child process;
wherein the different object code comprises:
    program code for using the saved copy of the first pointer to transfer execution to the intercepted system call, thereby establishing a communication channel;
    program code for determining that the established communication channel is to one of the plurality of network addresses serviced by the application program and its child process:
        program code for obtaining a quality of service parameter associated with the network address; and
        program code for utilizing an operating system resource to request a guarantee, to the child process, of a quality of service according to the obtained quality of service parameter.

11. A computer-readable medium storing a computer program product for providing a quality of service guarantee to a child process of an application program, wherein the application program and its child process service requests made to a plurality of network addresses, a network address indicating a virtual host, a virtual host comprising a virtualized server application program, the computer program product comprising:
    program code for storing a quality of service parameter associated with a network address;
    program code for intercepting a system call which establishes a communication channel between a client and the network address;
    program code for allowing establishment of the communication channel;
    program code for storing an indicator of an association between an application program that made the intercepted system call, the established communication channel, and the network address;
    program code for intercepting a system call which creates a child process;
    program code for allowing creation of the child process;
    program code for storing an indicator of an association between an application program that made the intercepted system call and the created child process;
    program code for intercepting a system call which creates a copy of a file descriptor;
    program code for allowing creation of the copy of the file descriptor;
    program code for storing an indicator of an association between the file descriptor and the created copy of the file descriptor;
    program code for intercepting a system call which transports data through a communication channel;
    program code for determining, by examining the stored association indicators, that an application that called the intercepted system call is a child process of a parent application that established a communication channel to the network address;
    program code for determining, by examining the stored association indicators that the communication channel through which the intercepted system call transports data is the communication channel established by the parent application to the network address;
    program code for obtaining the quality of service parameter associated with the network address;
    utilizing an operating system resource to request a guarantee to the child process that called the intercepted system call, of a quality of service according to the obtained quality of service parameter associated with the network address; and
    program code for allowing data to be transported through the communication channel.

12. The computer-readable medium of claim 11 wherein the program code for storing the quality of service parameter associated with the network address comprises program code for modifying an operating system to include a quality of service parameter table comprising the quality of service parameter associated with the network address.

13. The computer-readable medium of claim 12 wherein the program code for modifying the operating system comprises program code for linking a module to an operating system kernel, the module comprising the quality of service parameter table.

14. The computer-readable medium of claim 11 wherein the computer program product further comprises
    program code for saving a copy of a first pointer, which points to object code of the system call to intercept; and
    wherein the program code for intercepting the system call comprises program code for replacing the first pointer with a second pointer which points to different object code, such that making the system call causes the different object code to execute.

15. The computer-readable medium of claim 14 wherein the intercepted system call comprises a system call which establishes a communication channel between a client and a network address, and wherein the different object code comprises:
    program code for allowing establishment of the communication channel by using the saved copy of the first pointer to transfer execution to the intercepted system call; and
    program code for storing an association between the application program and the established communication channel by storing in an association table an entry indicating an association between a process identification number of the application program that made the system call, a file descriptor describing the established communication channel, and the network address to which the channel was established.

16. The computer-readable medium of claim 14, wherein the intercepted system call comprises a system call which creates a child process, and wherein the different object code comprises:
   program code for allowing creation of the child process by using the saved copy of the first pointer to transfer execution to the intercepted system call; and
   program code for storing an association between the application program that called the system call and the created child process by storing, in an association table, an entry indicating an association between a process identification number of the application program that made the system call and a process identification number of the created child process.

17. The computer-readable medium of claim 14 wherein the computer program product further comprises program code for inserting the different object code into the operating system.

18. The computer-readable medium of claim 17 wherein the program code for inserting the different object code into the operating system comprises program code for linking a module to an operating system kernel, the module comprising the different object code.

* * * * *

UNITED STATES PATENT AND TRADEMARK OFFICE
CERTIFICATE OF CORRECTION

PATENT NO. : 6,976,258 B1
DATED : December 13, 2005
INVENTOR(S) : Pawan Goyal et al.

It is certified that error appears in the above-identified patent and that said Letters Patent is hereby corrected as shown below:

Column 17,
Lines 12-13, delete "program the method" and insert -- program, the method --.
Line 20, delete "Points" and insert -- points --.

Column 18,
Line 6, delete "one".

Column 19,
Line 3, delete "claim 7" and insert -- claim 8 --.

Signed and Sealed this

Seventh Day of March, 2006

JON W. DUDAS
*Director of the United States Patent and Trademark Office*